(12) United States Patent
Lippert (10) Patent No.: US 10,001,197 B2
(45) Date of Patent: Jun. 19, 2018

(54) MULTIPLE SPEED TRANSMISSION WITH INTEGRATED LOW RANGE

(71) Applicant: Ford Global Technologies, LLC, Dearborn, MI (US)

(72) Inventor: Robert Scott Lippert, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 353 days.

(21) Appl. No.: 14/734,243

(22) Filed: Jun. 9, 2015

(65) Prior Publication Data

US 2015/0267784 A1    Sep. 24, 2015

Related U.S. Application Data

(62) Division of application No. 13/615,847, filed on Sep. 14, 2012, now Pat. No. 9,169,901.

(51) Int. Cl.
*F16H 3/66*    (2006.01)

(52) U.S. Cl.
CPC ......... *F16H 3/66* (2013.01); *F16H 2200/006* (2013.01); *F16H 2200/0078* (2013.01); *F16H 2200/2012* (2013.01); *F16H 2200/2046* (2013.01); *F16H 2200/2097* (2013.01)

(58) Field of Classification Search
CPC ................. F16H 3/66; F16H 2200/006; F16H 2200/0078; F16H 2200/2012; F16H 2200/2046; F16H 2200/2097
See application file for complete search history.

(56) References Cited

U.S. PATENT DOCUMENTS

| | | |
|---|---|---|
| 6,238,317 B1 | 5/2001 | Brown et al. |
| 6,955,627 B2 | 10/2005 | Thomas et al. |
| 6,984,187 B2 | 1/2006 | Biermann |
| 7,086,987 B2 | 8/2006 | Janson et al. |
| 7,691,022 B2 | 4/2010 | Phillips et al. |
| 7,691,024 B2 | 4/2010 | Phillips et al. |
| 8,113,982 B2 | 2/2012 | Baldwin |
| 8,177,674 B2 | 5/2012 | Baldwin |

(Continued)

OTHER PUBLICATIONS

Ben Ford, H., et al., The Lever Analogy: A New Tool in Transmission Analysis, 1982, Society of Automotive Engineers, Inc. 810102, pp. 429-437.

(Continued)

*Primary Examiner* — Huan Le
(74) *Attorney, Agent, or Firm* — James Dottavio; Brooks Kushman P.C.

(57) ABSTRACT

A transmission gearing arrangement includes four simple planetary gear sets, a range selection clutch, and five other clutches including one brake. The transmission is operated in high range by engaging the range selection clutch and in low range by disengaging the range selection clutch. In high range, the transmission produces eight forward speed ratios and one reverse speed ratio by selective engagement of various combinations of three of the five other clutches. In low range, the transmission produces five forward speed ratios by selective engagement of various combinations of two of the other five clutches. The transmission can shift from the fourth low range ratio to the third high range ratio while the vehicle is in motion.

14 Claims, 5 Drawing Sheets

(56) References Cited

U.S. PATENT DOCUMENTS

| | | |
|---|---|---|
| 8,187,137 B2 | 5/2012 | Carey et al. |
| 8,197,376 B2 | 6/2012 | Gumpoltsberger et al. |
| 8,231,495 B2 | 7/2012 | Gumpoltsberger et al. |
| 8,241,170 B2 | 8/2012 | Gumpoltsberger et al. |
| 8,241,171 B2 | 8/2012 | Gumpoltsberger et al. |
| 8,303,455 B2 | 11/2012 | Gumpoltsberger et al. |
| 8,439,782 B2 | 5/2013 | Sugino |
| 2008/0242486 A1* | 10/2008 | Hart .......... F16H 3/66 475/276 |
| 2009/0017981 A1* | 1/2009 | Hukill ........ F16H 3/66 475/323 |
| 2009/0270212 A1 | 10/2009 | Ueda et al. |
| 2010/0331138 A1 | 12/2010 | Phillips |
| 2011/0111916 A1 | 5/2011 | Carey et al. |
| 2011/0244998 A1 | 10/2011 | Triller |
| 2011/0245013 A1 | 10/2011 | Kim |
| 2011/0294617 A1 | 12/2011 | Seo et al. |

OTHER PUBLICATIONS

Chinese Office Action dated Nov. 2, 2016 for CN Appln. No. 201310397485.8 filed Sep. 4, 2013, 5 pages.

\* cited by examiner

|     | 60 | 62 | 64 | 66 | 68 | 70 | Ratio | Step |
|-----|----|----|----|----|----|----|-------|------|
| Rev | X  | X  | X  |    |    |    | -3.52 | 77%  |
| 1st |    | X  | X  | X  |    |    | 4.56  |      |
| 2nd |    | X  | X  |    | X  |    | 3.11  | 1.47 |
| 3rd |    | X  |    | X  | X  |    | 2.13  | 1.46 |
| 4th | X  | X  |    |    | X  |    | 1.68  | 1.27 |
| 5th | X  | X  |    | X  |    |    | 1.28  | 1.31 |
| 6th | X  |    |    | X  | X  |    | 1.00  | 1.28 |
| 7th | X  |    | X  | X  |    |    | 0.85  | 1.17 |
| 8th | X  |    | X  |    | X  |    | 0.68  | 1.25 |

Figure 3

|       | 60 | 62 | 64 | 66 | 68 | 70 | Ratio | Step |
|-------|----|----|----|----|----|----|-------|------|
| Low 1 | X  |    | X  |    |    | X  | 10.18 |      |
| Low 2 | X  | X  |    |    | X  | X  | 5.30  | 1.92 |
| Low 3 | X  |    |    |    | X  | X  | 3.12  | 1.70 |
| Low 4 |    |    |    | X  | X  | X  | 2.13  | 1.47 |
| Low 5 |    |    | X  |    | X  | X  | 1.75  | 1.22 |

|  | 60 | 62 | 64 | 66 | 68 | 70 | Ratio | Step |
|---|---|---|---|---|---|---|---|---|
| Low 1 | X |  |  |  |  | X | 10.18 |  |
| Low 2 | X | X |  |  |  | X | 5.30 | 1.92 |
| Low 3 | X |  |  |  | X | X | 3.12 | 1.70 |
| Low 4 |  |  |  | X | X | X | 2.13 | 1.47 |
| 3rd |  | X |  | X | X |  | 2.13 | - |
| 4th | X | X |  |  | X |  | 1.68 | 1.27 |
| 5th | X | X |  | X |  |  | 1.28 | 1.31 |
| 6th | X |  |  | X | X |  | 1.00 | 1.28 |
| 7th | X |  | X |  |  |  | 0.85 | 1.17 |
| 8th | X |  | X |  | X |  | 0.68 | 1.25 |

Figure 6

MULTIPLE SPEED TRANSMISSION WITH INTEGRATED LOW RANGE

CROSS-REFERENCE TO RELATED APPLICATIONS

This application is a division of U.S. application Ser. No. 13/615,847 filed Sep. 14, 2012, now U.S. Pat. No. 9,169,901 issued Oct. 27, 2015, the disclosure of which is hereby incorporated in its entirety by reference herein.

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Some vehicles are equipped with a two speed secondary transmission such that a driver can select a high range and a low range. The high range may be selected for on-road transportation while the low range may be used to provide higher speed ratios for off-road use. In some situations, such as transitioning from on-road to off-road or from off-road to on-road conditions, it is desirable to shift between high and low range while the vehicle is moving, preferably without interrupting the flow of power to the vehicle wheels.

SUMMARY OF THE DISCLOSURE

A transmission gearing arrangement includes a range selection clutch and five other clutches. The transmission is operated in high range by engaging the range selection clutch and in low range by disengaging the range selection clutch. The transmission can shift from the fourth low range ratio to the third high range ratio while the vehicle is in motion.

In one embodiment, a transmission includes input and output shaft and first, second, third, fourth, and sixth rotating elements. A first gearing arrangement fixedly constrains the speed of the input shaft to be between that of the first and second elements. The first gearing arrangement may be, for example, a simple planetary gear set with the sun gear as the first element, the ring gear as the second element, and the carrier fixedly coupled to the input shaft. A second gearing arrangement fixedly constrains the speed of the output shaft to be between that of the third and fourth elements. The second gearing arrangement may be, for example, a simple planetary gear set with the sun gear as the third element, the ring gear as the fourth element, and the carrier fixedly coupled to the output shaft. A third gearing arrangement fixedly constrains the speed of the fourth element to be between zero and the speed of the sixth element. The third gearing arrangement may be, for example, a simple planetary gear set with the sun gear as the sixth element, the ring gear fixedly held against rotation, and the carrier fixedly coupled to the fourth element. A fourth gearing arrangement selectively constrains the speed of the output shaft to be between that of the second and third elements. The fourth gearing arrangement may be, for example, a simple planetary gear set with the sun gear selectively coupled to second element, the ring gear fixedly coupled to the third element, and the carrier fixedly coupled to the output shaft. A range clutch selectively couples the sixth element to the input shaft. The third element is selectively coupled to the second element by a second clutch and to the input shaft by a third clutch. The first element is selectively coupled to the sixth element by a fourth clutch and held against rotation by a brake.

In another embodiment, a transmission includes input and output shaft and first, second, third, fourth, fifth, and sixth rotating elements. A first gearing arrangement fixedly constrains the speed of the input shaft to be between that of the first and second elements. The first gearing arrangement may be, for example, a simple planetary gear set with the sun gear as the first element, the ring gear as the second element, and the carrier fixedly coupled to the input shaft. A second gearing arrangement fixedly constrains the speed of the third element, the output shaft, the fourth element, and the fifth element to be linearly related. The second gearing arrangement may be, for example, two simple planetary gear sets with the first sun gear as the fifth element, the two carriers fixedly coupled to one another and to the output shaft, the second ring gear as the fourth element, and first ring gear fixedly coupled to the second sun gear as the third element. A third gearing arrangement fixedly constrains the speed of the fourth element to be between zero and the speed of the sixth element. The third gearing arrangement may be, for example, a simple planetary gear set with the sun gear as the sixth element, the ring gear fixedly held against rotation, and the carrier fixedly coupled to the fourth element. A range clutch selectively couples the sixth element to the input shaft. The third element is selectively coupled to the second element by a second clutch and to the input shaft by a third clutch. The first element is selectively coupled to the sixth element by a fourth clutch and held against rotation by a brake. A fifth clutch selectively couples the second element to the fifth element.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission has a shiftable gearing arrangement that selectively imposes a variety of speed ratios between an input shaft and an output shaft.

A group of elements are fixedly coupled to one another if they are constrained to rotate as a unit in all operating conditions. Elements may be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one way clutches. A clutch that holds an element against rotation by selectively connecting the element to the housing may be called a brake.

Shifts among speed ratios may be performed without interrupting the flow of power from the input shaft to the output shaft by carefully coordinating the engagement of one clutch with the disengagement of another clutch. During the transition, one of both of these clutches must transmit torque between elements moving at different speeds. In such a condition, heat is absorbed and dissipated by the clutch. The amount of energy absorbed is larger when the ratio of the two speed ratios involved, called the step size, is higher. Sometimes, providing a clutch with enough energy absorption capability dictates the sizing of the clutch and increases the amount of parasitic drag the clutch causes when disengaged. Also, shifts with very large step sizes are difficult to perform without generating large torque disturbances at the output shaft which may be uncomfortable for vehicle occupants.

Typical secondary transmissions have step sizes exceeding 2:1. In order to minimize the parasitic drag associated with the secondary transmission, the secondary transmission is often configured such that shifting between the low range and high range is only possible when the vehicle is stationary. If range shifts are allowed while the vehicle is moving, it may be necessary to interrupt the flow of power by putting the primary transmission in neutral while shifting the secondary transmission.

Figure 1:
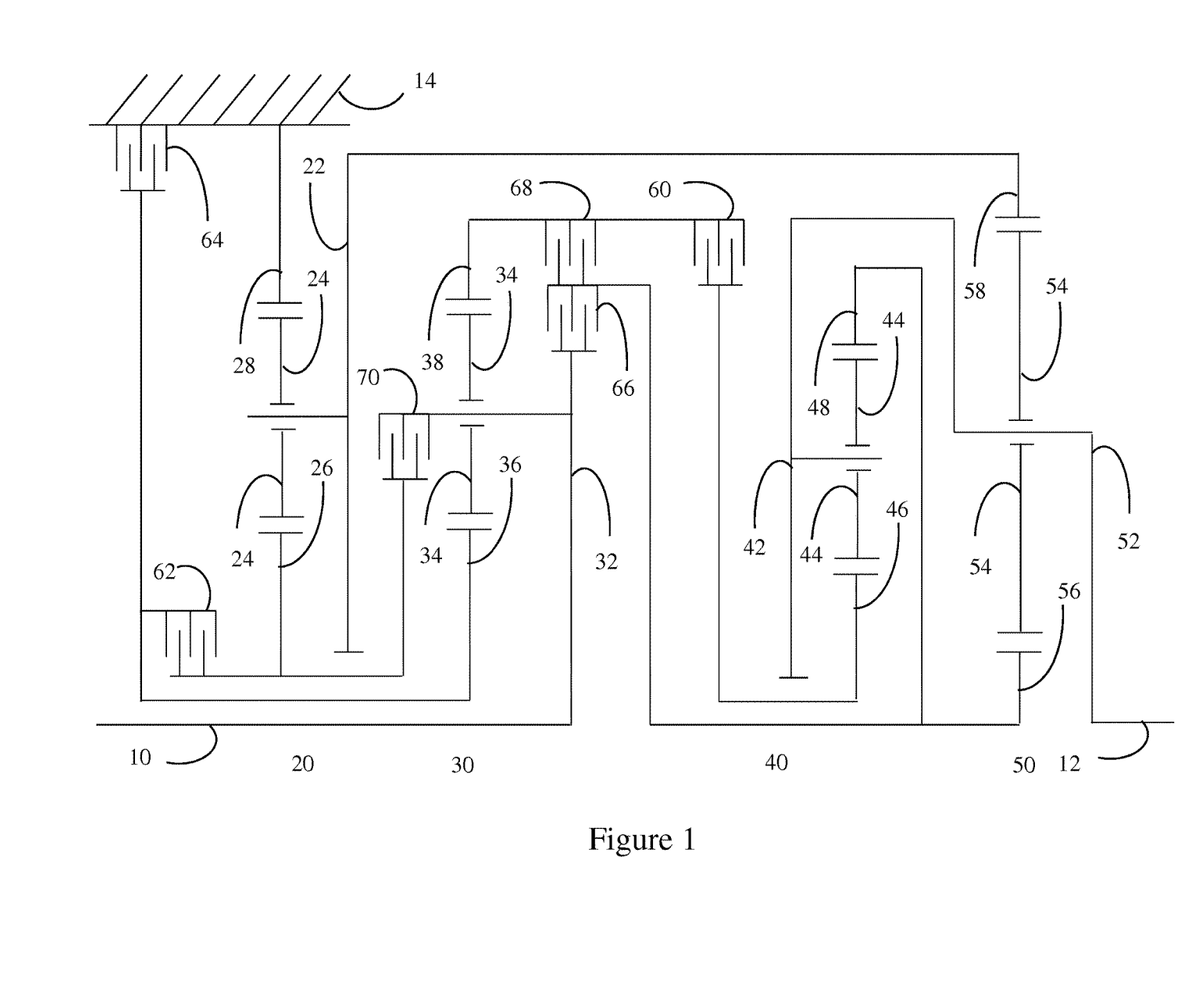
FIG. 1 is a schematic diagram of a transmission gearing arrangement.

An example transmission is schematically illustrated in FIG. 1. The transmission utilizes four simple planetary gear sets 20, 30, 40, and 50. A simple planetary gear set is a type of fixed gearing arrangement. A planet carrier 22 rotates about a central axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the same axis as the carrier. A simple planetary gear set imposes the fixed speed relationship that the speed of the carrier is between the speed of the sun gear and the speed of the ring gear. (This relationship is defined to include the condition in which all three rotate at the same speed.) More specifically, the speed of the carrier is a weighted average of the speed of the sun gear and the speed of the ring gear with weighting factors determined by the number of teeth on each gear. Similar speed relationships are imposed by other known types of fixed gearing arrangements. For example, a double pinion planetary gear set constrains the speed of the ring gear to be a weighted average between the speed of the sun gear and the speed of the carrier. A suggested ratio of gear teeth for each planetary gear set in FIG. 1 is listed in Table 1.

TABLE 1

| Ring 28/Sun 26 | 2.12 |
|---|---|
| Ring 38/Sun 36 | 2.14 |
| Ring 48/Sun 46 | 1.73 |
| Ring 58/Sun 56 | 3.56 |

Input shaft 10 is fixedly coupled to carrier 32. Output shaft 12 is fixedly coupled to carrier 42 and carrier 52. Ring gear 28 is fixedly held against rotation by transmission case 14. Carrier 22 is fixedly coupled to ring gear 58. Ring gear 48 is fixedly coupled to sun gear 56. Sun gear 36 is selectively coupled to sun gear 26 by clutch 62 and selectively held against rotation by brake 64. Input shaft 10 and carrier 32 are selectively coupled to sun gear 26 by range clutch 70 and selectively coupled to ring gear 48 and sun gear 56 by clutch 66. Ring gear 38 is selectively coupled to sun gear 46 by clutch 60 and selectively coupled to ring gear 48 and sun gear 56 by clutch 68.

Figure 2:
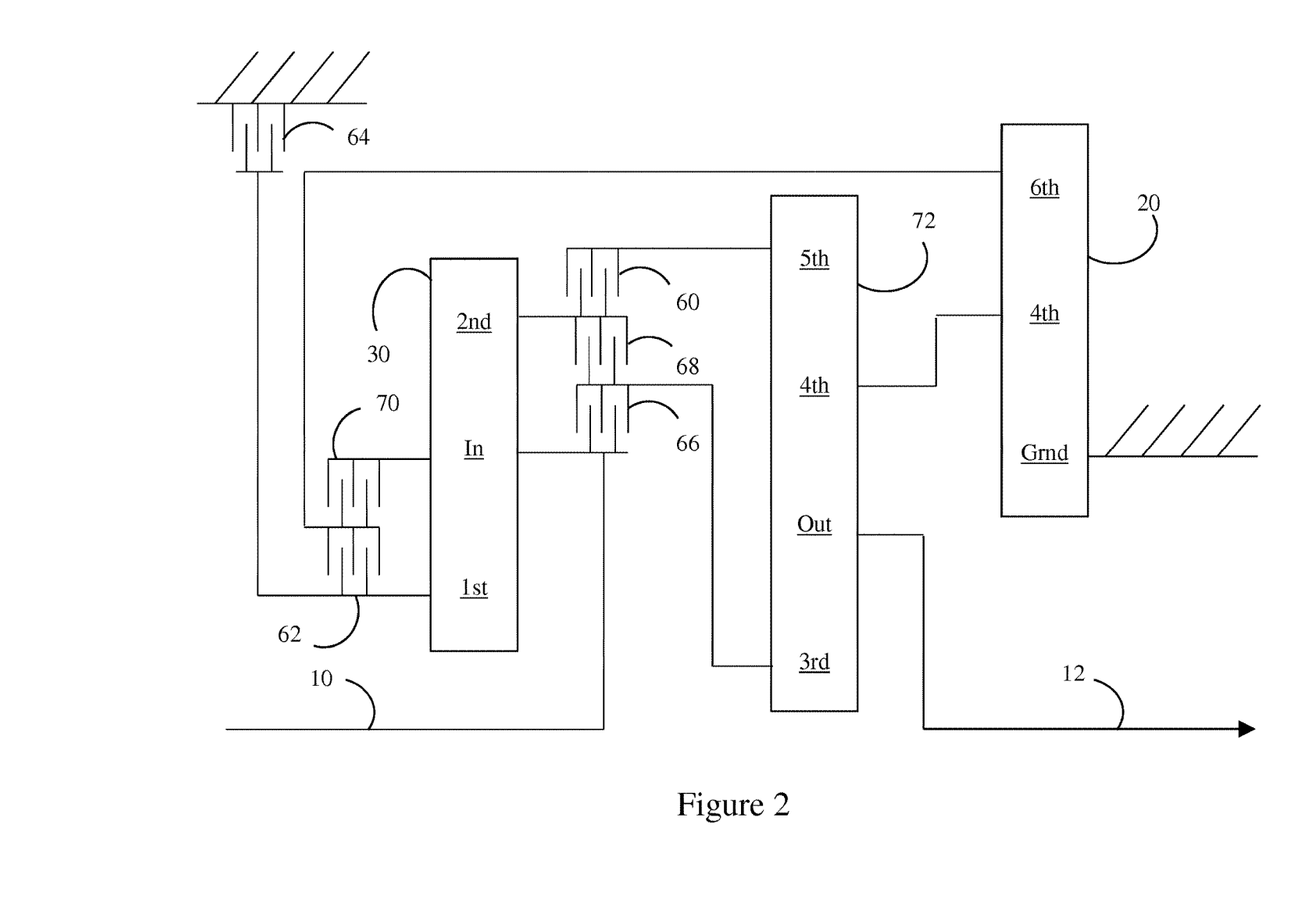
FIG. 2 is a lever diagram corresponding to the gearing arrangement of FIG. 1.

FIG. 2 describes the transmission of FIG. 1 in the form of a lever diagram. Gear elements which rotate about a common axis and have speeds with a fixed linear relationship are shown along a lever according to their relative speeds. The two elements that have the most extreme speeds are shown at the endpoints of the lever. The remaining elements are shown at intermediate points. The 1st through 6th rotating elements each correspond to one or more planetary gear elements. Gear sets 20 and 30 correspond directly to three node levers with the sun gear at one endpoint, the ring gear at the opposite endpoint, and the carrier at an intermediate point. Specifically, the 1st element corresponds to sun gear 36, the 2nd element corresponds to ring gear 38, the 4th element corresponds to carrier 22, and the 6th element corresponds to sun gear 26. Four node lever 72 corresponds to gear sets 40 and 50, with the 3rd element corresponding to ring gear 48 and sun gear 56, the 4th element corresponding to ring gear 58, and the 5th element corresponding to sun gear 46. Any four element fixed gearing arrangement that imposes the designated speed relationships with appropriate weighting factors may be substituted for gear sets 40 and 50 of FIG. 1 without impacting the transmission speed ratios. Any combination of two planetary gear sets with two elements of each fixedly connected to two elements of the other forms a four element fixed gearing arrangement. Some fixed gearing arrangements will be preferable to others in terms of packaging, efficiency, and planet gear speeds.

The clutches and brakes may be hydraulically actuated multi-plate clutches or other types of clutches that are actively engaged and disengaged by a controller. As discussed below, it is possible to operate the transmission such that the controller does not need to accurately modulate the torque capacity of range clutch 70 and range clutch 70 does not absorb appreciable energy during shifts. Consequently, the design of range clutch 70 can be optimized for very low parasitic drag. Also, brake 64 can be a combination of a controllable friction clutch and a passive one way clutch. Such a combination may be engaged either actively by the controller or as a result of the one way clutch resisting rotation in a reverse direction.

Figure 3:
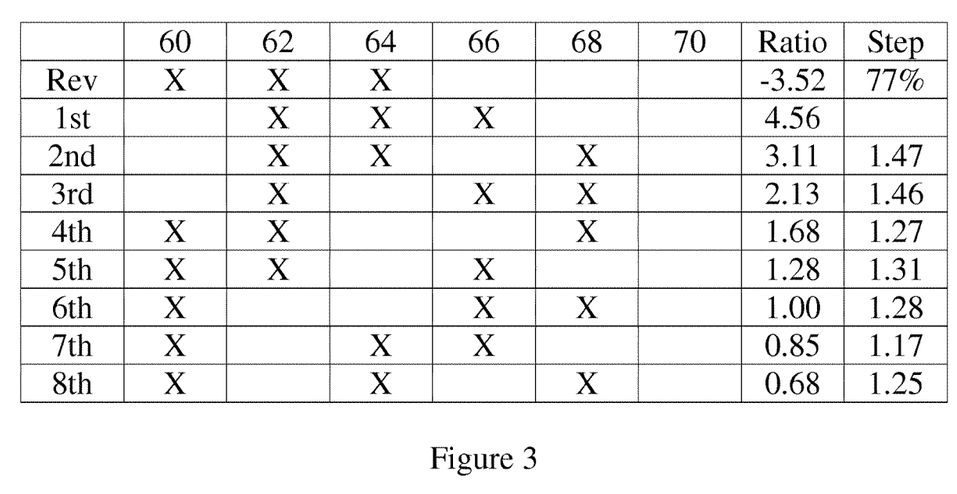
FIG. 3 is a clutch application chart indicating the state of each clutch in the gearing arrangement of FIG. 1 and the resulting speed ratios when operated in a high range.
Figure 4:
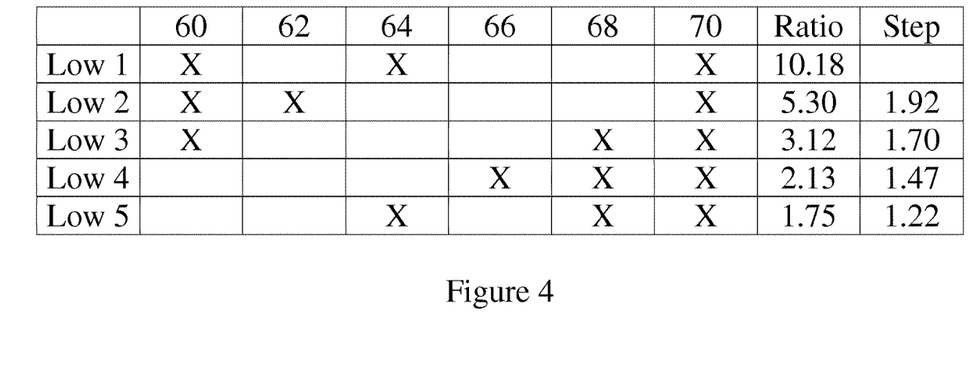
FIG. 4 is a clutch application chart indicating the state of each clutch in the gearing arrangement of FIG. 1 and the resulting speed ratios when operated in a low range.
Figure 5:
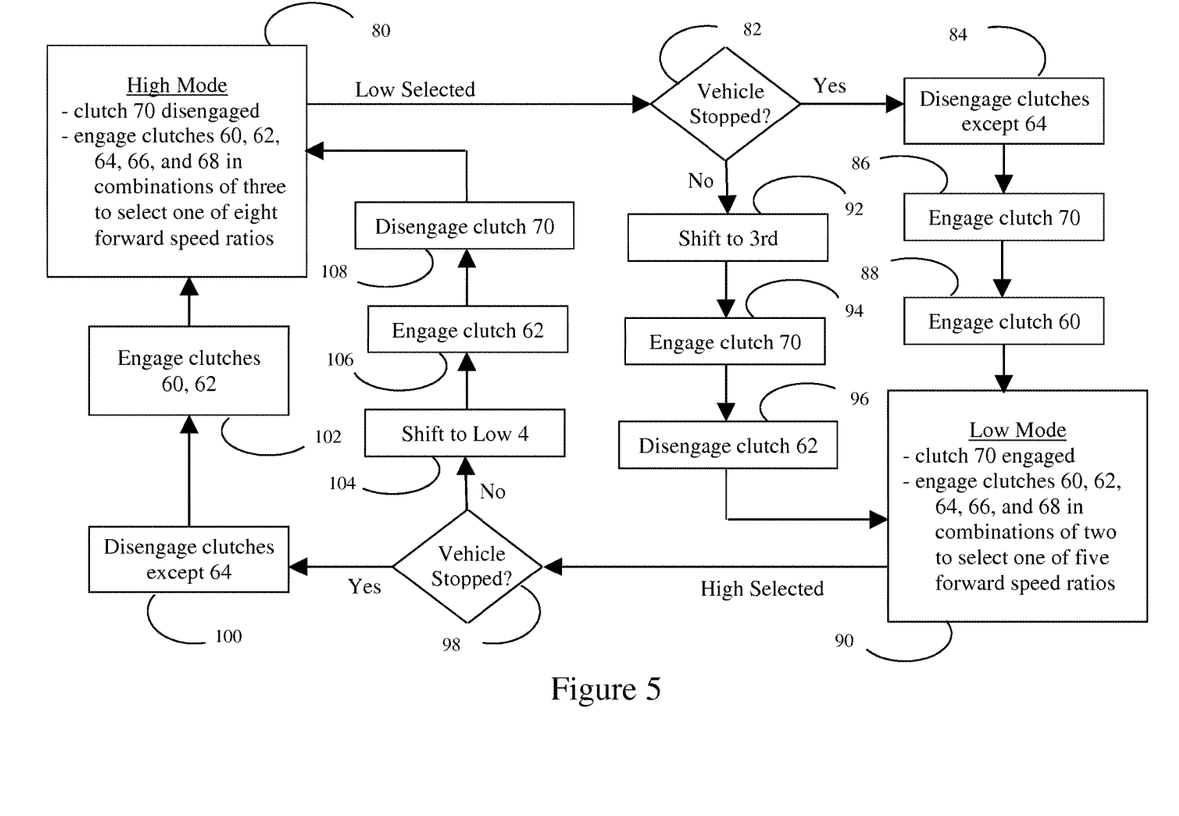
FIG. 5 is a flow diagram illustrating the steps required to transition between low range and high range.

As shown in FIGS. 3-5, engaging the clutches in combinations of three establishes a variety of forward and reverse speed ratios between input shaft 10 and output shaft 12. An X indicates that the clutch is engaged to establish the speed ratio. When the gear sets of FIG. 1 have tooth numbers as indicated in Table 1, the speed ratios have the values indicated in FIGS. 3-5.

FIG. 3 indicates which clutches are applied during high range operation. Range clutch 70 is disengaged in all high range gear states. All shifts between adjacent speed ratios can be accomplished by the coordinated release of one clutch and the engagement of one other clutch. Similarly, all two-step shifts and many of the three step shifts can be accomplished by the coordinated release of one clutch and engagement of one other clutch. If the transmission is equipped with a launch device such as a torque converter or launch clutch, then the transmission is prepared for forward driving by engaging clutches 62 and 66 and brake 64. Alternatively, brake 64 can be utilized as a launch clutch. For reverse driving, clutch 60 is engaged instead of clutch 66. FIG. 4 indicates which clutches are applied during low range forward operation. Range clutch 70 is engaged in all low range gear states.

FIG. 5 illustrates a process for transitioning between low range and high range in response to a driver changing the selected range. Operation in high range is shown at 80. Two sequences of clutch transitions effect the change from high range to low range. The controller selects between these two sequences at 82 based on vehicle speed. If the vehicle is stopped or nearly stopped, the controller disengages all currently engaged clutches except clutch 64 at 84, placing the transmission in neutral. Then, clutch 70 is engaged at 86. The only energy absorbed by clutch 70 during this engagement is the energy associated with the inertia of transmission components, which is small because all transmission components are rotating slowly if at all. Because the transmission is still in neutral even after clutch 70 is engaged, very little torque disturbance is transmitted to the output shaft. At 88, clutch 60 is engaged. At that point, the transmission in is Low 1, and operation in low mode commences at 90. If the vehicle is moving, a different sequence of transitions is selected at 82. At 92, the transmission is shifted to 3rd gear if it was in some other gear. If this shift is not allowed due to excessive vehicle speed, the controller waits until vehicle speed decreases and then shifts into 3rd gear. At 94, clutch 70 is engaged. In 3rd gear, sun gear 26 and the input shaft, the two elements coupled by clutch 70, rotate at the same speed. Consequently, engaging clutch 70 does not change the speed of any elements or cause any output torque disturbance. Then, clutch 62 is disengaged at 96, placing the transmission in Low 4, and operation in low mode commences at 90. The transmission continues to transmit power from the input shaft to the output shaft throughout the transition from high mode to low mode by this later sequence.

Similarly, two sequences of clutch transitions effect the change from low mode to high mode. The controller selects between these two sequences at 98 based on vehicle speed. If the vehicle is stopped or nearly stopped, the controller disengages all currently engaged clutches except clutch 64 at 100, placing the transmission in neutral. Then, clutches 60 and 62 are engaged at 102 placing the transmission in 3rd gear. Operation in high mode commences at 80. If the vehicle is moving, a different sequence of transitions is selected at 98. At 104, the transmission is shifted to Low 4 if it was in some other gear. At 106, clutch 62 is engaged. Then, clutch 70 is disengaged at 108, placing the transmission in 3rd gear, and operation in high mode commences at 80. The transmission continues to transmit power from the input shaft to the output shaft throughout the transition from high mode to low mode by this later sequence.

Figure 6:
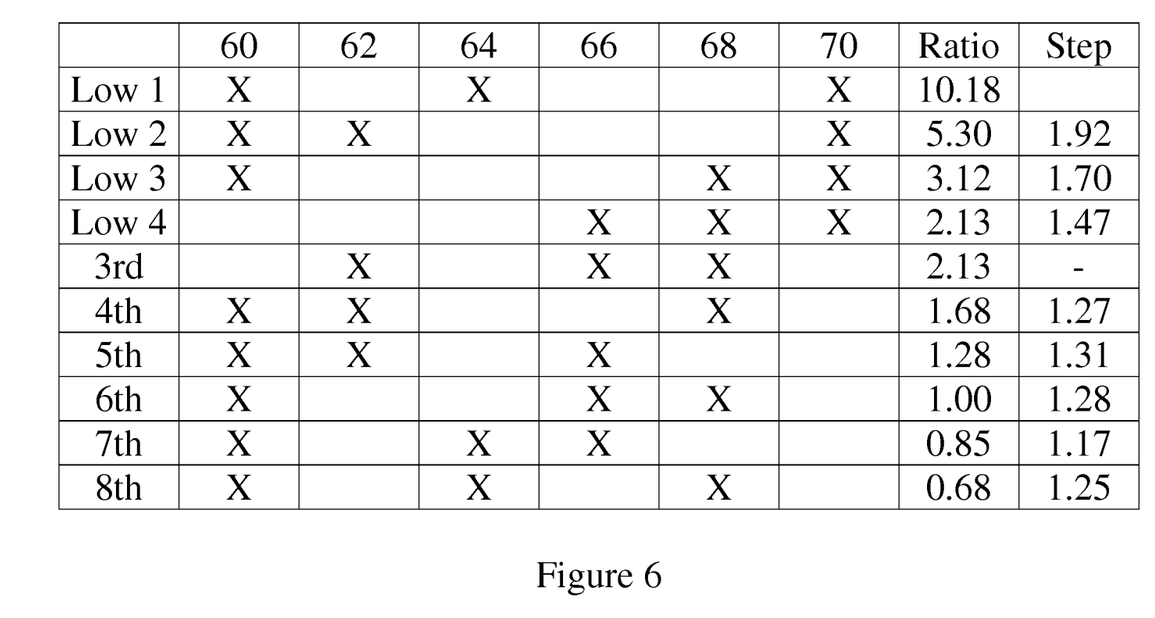
FIG. 6 is a clutch application chart indicating the state of each clutch in the gearing arrangement of FIG. 1 and the resulting speed ratio when operated in a combined low and high range.

FIG. 6 is a clutch application chart for a combined low and high range mode of operation. In this mode of operation, the transmission is automatically shifted between low range and high range based on vehicle speed or other factors like accelerator pedal position. At low speed, the transmission operates in low range, utilizing Low 1 through Low 4 speed ratios. If a further upshift is indicated, the transmission first shifts into 3rd gear by engaging clutch 62 and then disengaging clutch 70. At higher speeds, the transmission operates in high range, utilizing 3rd through 8th gears. If a further downshift is indicated while operating in 3rd gear, the transmission first shifts into low range by engaging clutch 70 and then releasing clutch 62.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A transmission comprising:
an input shaft;
an output shaft;
a first gearing arrangement configured to fixedly constrain the input shaft to rotate at a speed between speeds of a first element and a second element;
a second gearing arrangement configured to fixedly constrain the output shaft to rotate at a speed between speeds of a third element and a fourth element;
a third gearing arrangement configured to fixedly constrain the fourth element to rotate at a speed between zero and a speed of a sixth element, the third gearing arrangement comprising a first simple planetary gear set having a first sun gear as the sixth element, a first planet carrier fixedly coupled to the fourth element, a first ring gear fixedly held against rotation, and a first plurality of planet gears supported for rotation relative to the first planet carrier and in continuous meshing engagement with both the first sun gear and the first ring gear;
a fourth gearing arrangement configured to selectively constrain the output shaft to rotate at a speed between speeds of the third element and the second element; and
a first clutch selectively coupling the sixth element to the input shaft.

2. The transmission of claim 1 further comprising:
a first brake selectively holding the first element against rotation;
a second clutch selectively coupling the second element to the third element;
a third clutch selectively coupling the third element to the input shaft; and
a fourth clutch selectively coupling the first element to the sixth element.

3. The transmission of claim 1 wherein the first gearing arrangement comprises a second simple planetary gear set having a second sun gear as the first element, a second planet carrier fixedly coupled to the input shaft, a second ring gear as the second element, and a second plurality of planet gears supported for rotation relative to the second planet carrier and in continuous meshing engagement with both the second sun gear and the second ring gear.

4. The transmission of claim 1 wherein the second gearing arrangement comprises a second simple planetary gear set having a second sun gear as the third element, a second planet carrier fixedly coupled to the output shaft, a second ring gear as the fourth element, and a second plurality of planet gears supported for rotation relative to the second planet carrier and in continuous meshing engagement with both the second sun gear and the second ring gear.

5. The transmission of claim 1 wherein the fourth gearing arrangement comprises
a simple planetary gear set having a sun gear, a planet carrier fixedly coupled to the output shaft, a ring gear fixedly coupled to the third element, and a plurality of planet gears supported for rotation relative to the planet carrier and in continuous meshing engagement with both the sun gear and the ring gear; and
a fifth clutch selectively coupling the sun gear to the second element.

6. A transmission comprising:
an input shaft;
an output shaft;
a first gearing arrangement configured to fixedly constrain the input shaft to rotate at a speed between speeds of a first element and a second element;
a second gearing arrangement configured to fixedly constrain the output shaft to rotate at a speed between speeds of a third element and a fourth element and to fixedly constrain the fourth element to rotate at a speed between speeds of the output shaft and a fifth element;
a third gearing arrangement configured to fixedly constrain the fourth element to rotate at a speed between zero and a speed of a sixth element;
a first clutch selectively coupling the sixth element to the input shaft;
a first brake selectively holding the first element against rotation;
a second clutch selectively coupling the second element to the third element;
a third clutch selectively coupling the third element to the input shaft;
a fourth clutch selectively coupling the first element to the sixth element; and
a fifth clutch selectively coupling the second element to the fifth element.

7. The transmission of claim 6 wherein the first gearing arrangement comprises a simple planetary gear set having a sun gear as the first element, a planet carrier fixedly coupled to the input shaft, a ring gear as the second element, and a plurality of planet gears supported for rotation relative to the planet carrier and in continuous meshing engagement with both the sun gear and the ring gear.

8. The transmission of claim 6 wherein the second gearing arrangement comprises
a first simple planetary gear set having a first sun gear as the fifth element, a first planet carrier fixedly coupled to the output shaft, a first ring gear as the third element, and a first plurality of planet gears supported for rotation relative to the first planet carrier and in continuous meshing engagement with both the first sun gear and the first ring gear; and
a second simple planetary gear set having a second sun gear fixedly coupled to the first ring gear, a second planet carrier fixedly coupled to the output shaft, a second ring gear as the fourth element, and a second plurality of planet gears supported for rotation relative to the second planet carrier and in continuous meshing engagement with both the second sun gear and the second ring gear.

9. The transmission of claim 6 wherein the third gearing arrangement comprises a simple planetary gear set having a sun gear as the sixth element, a planet carrier fixedly coupled to the fourth element, a ring gear fixedly held against rotation, and a plurality of planet gears supported for rotation relative to the planet carrier and in continuous meshing engagement with both the sun gear and the ring gear.

10. A transmission comprising:
first through fourth planetary gearsets having first through fourth suns, carriers, and rings respectively wherein the first ring is fixedly held against rotation, the first carrier is fixedly coupled to the fourth ring, the second carrier is fixedly coupled to an input, the third and fourth carriers are fixedly coupled to an output, and the third ring is fixedly coupled to the fourth sun.

11. The transmission of claim 10 further comprising:
a first clutch configured to selectively couple the input to the first sun.

12. The transmission of claim 11 further comprising:
a second clutch configured to selectively couple the second ring to the third sun.

13. The transmission of claim 12 further comprising:
a third clutch configured to selectively couple the first sun to the second sun;
a fourth clutch configured to selectively couple the input to the third ring;
a fifth clutch configured to selectively couple the second ring to the third ring; and
a brake configured to selectively hold the second sun against rotation.

14. The transmission of claim 11 further comprising a controller configured to engage the first clutch in response to selection of a low range and to release the first clutch in response to selection of a high range.

* * * * *